(12) United States Patent
Arabi et al.

(10) Patent No.: US 10,772,364 B2
(45) Date of Patent: Sep. 15, 2020

(54) SELF-SUSTAINABLE BODY-COOLING GARMENT

(71) Applicant: ABU DHABI UNIVERSITY, Abu Dhabi (AE)

(72) Inventors: Alya Ali Arabi, Abu Dhabi (AE); Dina Nidal Refki, Abu Dhabi (AE); Dima Samer Ali, Abu Dhabi (AE)

(73) Assignee: ABU DHABI UNIVERSITY, Abu Dhabi (AE)

( * ) Notice: Subject to any disclaimer, the term of this patent is extended or adjusted under 35 U.S.C. 154(b) by 939 days.

(21) Appl. No.: 15/143,905

(22) Filed: May 2, 2016

(65) Prior Publication Data

US 2017/0311658 A1 Nov. 2, 2017

(51) Int. Cl.
| | | |
|---|---|---|
| *A43B 13/20* | (2006.01) | |
| *A41D 13/002* | (2006.01) | |
| *A41D 13/005* | (2006.01) | |
| *A41D 13/015* | (2006.01) | |
| *A41D 13/018* | (2006.01) | |
| *A01K 13/00* | (2006.01) | |

(52) U.S. Cl.
CPC ........ *A41D 13/0053* (2013.01); *A01K 13/007* (2013.01); *A41D 13/002* (2013.01); *A41D 13/0025* (2013.01); *A41D 13/018* (2013.01); *A41D 13/0155* (2013.01); *A43B 13/20* (2013.01); *A43B 13/203* (2013.01); *A43B 13/206* (2013.01)

(58) Field of Classification Search
CPC ..... A43B 13/20; A43B 13/203; A43B 13/206; A41D 13/002; A41D 13/0025; A41D 13/0053; A41D 13/0155; A41D 13/018

USPC .......................................................... 36/29
See application file for complete search history.

(56) References Cited

U.S. PATENT DOCUMENTS

| | | | | |
|---|---|---|---|---|
| 3,000,616 | A * | 9/1961 | Spangler ................. | A43B 7/02 165/46 |
| 3,888,242 | A * | 6/1975 | Harris .................. | A61H 9/0078 601/152 |
| 4,845,338 | A * | 7/1989 | Lakic ................... | A41D 19/001 219/211 |
| 4,941,271 | A * | 7/1990 | Lakic ............... | A41D 19/01535 36/117.1 |
| 5,007,893 | A * | 4/1991 | Row .................... | A62B 17/008 128/201.29 |
| 5,025,575 | A * | 6/1991 | Lakic ................... | A41D 19/001 36/29 |
| 5,335,430 | A * | 8/1994 | Fiso .................... | A43B 5/0407 36/136 |

(Continued)

*Primary Examiner* — Clinton T Ostrup
*Assistant Examiner* — Cameron A Carter

(57) ABSTRACT

There is also provided a self-sustainable body-cooling garment for cooling a body portion of a human or an animal adapted to use the air pumping footwear and a cooling system for cooling the human or animal's body. There is provided a footwear comprising an air pump adapted to pump air when worn by a human or an animal during a pedestrian movement and to store or direct the pumped air for use by a cooling system for cooling the pumped air and using the cooled air for cooling the human or the animal. There is also provided a cooling system comprising an air pump adapted to be embedded within a footwear and a nozzle adapted to cool air pumped using the footwear when worn by a human or animal during a pedestrian movement.

11 Claims, 5 Drawing Sheets

(56) References Cited

U.S. PATENT DOCUMENTS

| | | | | |
|---|---|---|---|---|
| 5,341,581 A * | 8/1994 | Huang | A43B 13/203 | 36/29 |
| 5,537,686 A * | 7/1996 | Krutz, Jr. | B64D 10/00 | 2/2.14 |
| 6,305,102 B1 * | 10/2001 | Doyle | A43B 13/203 | 36/29 |
| 6,976,321 B1 * | 12/2005 | Lakic | A43B 7/141 | 36/28 |
| 7,448,150 B1 * | 11/2008 | Davis | A43B 13/203 | 36/153 |
| 7,717,869 B2 * | 5/2010 | Eischen, Sr. | A43B 23/029 | 601/152 |
| 7,818,896 B2 * | 10/2010 | Hsieh | A43B 1/0036 | 36/29 |
| 9,144,267 B2 * | 9/2015 | Lo | A43B 7/081 | |
| 2001/0042320 A1 * | 11/2001 | Lindqvist | A43B 7/081 | 36/27 |
| 2002/0035794 A1 * | 3/2002 | Doyle | A43B 13/203 | 36/29 |
| 2003/0145486 A1 * | 8/2003 | Cardarelli | A43B 3/0078 | 36/3 B |
| 2004/0088882 A1 * | 5/2004 | Buttigieg | A43B 13/203 | 36/3 B |
| 2005/0028404 A1 * | 2/2005 | Marvin | A43B 1/0072 | 36/45 |
| 2005/0198862 A1 * | 9/2005 | Lo | A43B 7/08 | 36/27 |
| 2006/0143943 A1 * | 7/2006 | Cho | A43B 7/081 | 36/3 B |
| 2006/0156575 A1 * | 7/2006 | Lo | A43B 7/081 | 36/3 B |
| 2006/0196081 A1 * | 9/2006 | Lee | A43B 7/081 | 36/29 |
| 2008/0163512 A1 * | 7/2008 | Hazenberg | A43B 13/203 | 36/29 |
| 2009/0151203 A1 * | 6/2009 | Boyer | A43B 7/082 | 36/3 B |
| 2010/0199518 A1 * | 8/2010 | Buttigieg | A43B 3/0005 | 36/29 |
| 2011/0067264 A1 * | 3/2011 | Doyle | A43B 13/203 | 36/29 |
| 2012/0073161 A1 * | 3/2012 | Doyle | A43B 13/203 | 36/29 |
| 2012/0167413 A1 * | 7/2012 | Marvin | A43B 13/20 | 36/83 |
| 2012/0255195 A1 * | 10/2012 | Langvin | A43B 13/203 | 36/29 |
| 2012/0255197 A1 * | 10/2012 | Gishifu | A43B 7/148 | 36/29 |
| 2013/0118029 A1 * | 5/2013 | Kim | A43B 17/035 | 36/29 |
| 2014/0201884 A1 * | 7/2014 | Alder | B32B 27/00 | 2/93 |
| 2014/0259750 A1 * | 9/2014 | Yeh | A43B 13/20 | 36/29 |
| 2015/0040424 A1 * | 2/2015 | Lo | A43B 7/081 | 36/29 |
| 2015/0305436 A1 * | 10/2015 | Doyle | A43B 13/203 | 36/43 |

* cited by examiner

SELF-SUSTAINABLE BODY-COOLING GARMENT

FIELD OF THE INVENTION

The present invention is related to a self-sustainable body cooling garment for cooling hot air pumped using a footwear comprising an air pump adapted to pump air when worn using the pedestrian movement of a human or an animal and for diffusing the cooled air to a body portion of the human or the animal without need of additional energy. The present invention is also related to a footwear, such as a shoe or shoe insole, comprising an air pump adapted to pump air based on the user's pedestrian movement and to store it for use by a cooling system for cooling a body portion of the human or animal.

BACKGROUND OF THE INVENTION

During summer the temperature can raise high degrees up to 50-60 degrees Celsius (° C.) while the relative humidity levels fluctuate in the range of 80% to 90%, especially in regions where are known to experiment high level of temperature and humidity such as Middle East. In these thermal stressful environments, mechanisms that the body usually uses to maintain the average normal body temperature are no longer enough to stabilize it which leads to a dehydration, a drop in blood pressure, and an increase in the heart rate. Outdoor workers work for long hours putting their health at risk without achieving their full potential due to the discomfort caused by the high temperature.

Cooling suit systems, such as portable cooling vests and pants have already been tested and studied previously. There are mainly three types of cooling methods used in this type of suit; gel cooling packs, evaporation by chemical reaction and gas expansion. The gel cooling packs are efficient with very effective long duration. However, they require long recharge time, continuous need for refrigeration, with little control or regulation. The evaporation by chemical reaction is controllable and reusable. However, it is complex, it has residual waste, it needs frequent replacement of chemicals, chemicals might not be inert, and the vessels might block from residual leftovers. The gas expansion method is simple, rechargeable, environmentally friendly and clean and shows high performance for efficiency. However it needs large amounts of working fluid and the fluid should be readily available.

SUMMARY OF THE INVENTION

As a first aspect of the invention, there is provided a self-sustainable body-cooling garment for cooling a body portion of a human or animal comprising:
  a footwear comprising an air pump adapted to pump air when worn by a human or an animal during a pedestrian movement and to store the pumped air inside an air chamber;
  a nozzle configured to be in fluid communication with the air chamber for receiving and cooling the pumped air; and
  a body garment adapted to be worn by the human or the animal comprising air release channels adapted to be in fluid communication with the nozzle for receiving and diffusing the cooled air for cooling the body portion of the human or the animal.

In an embodiment of the invention, the nozzle has a conical shape, said conical-shaped nozzle having a hollow base, a hollow top, and an external wall, the nozzle comprising a nozzle inlet located at the hollow base of said conical-shaped nozzle and a nozzle outlet located at the hollow top of said nozzle, wherein the nozzle inlet is in fluid communication with the air chamber and the nozzle outlet is in fluid communication with the air release channels, and wherein the air being directed inside the nozzle is cooled by the effect of passage of the air inside the conical-shaped nozzle between the nozzle inlet and the nozzle outlet.

In an embodiment of the invention, the nozzle is adapted to be embedded with the body garment.

In an embodiment of the invention, the body garment comprises:
  a pair of pants for use by a human comprising capillary tubes and the nozzle in fluid communication with the air chamber and the capillary tubes for receiving the pumped air from the air chamber, cooling the air and directing the cooled air to the capillary tubes;
  a vest for use by the human comprising the air release channels in fluid communication with the capillary tubes for receiving the cooled air and for diffusing the cooled air to various emplacements of the body portion.

In an embodiment of the invention, the vest comprises hot air valves positioned at the shoulders level of the vest, where the hot air valves are in fluid communication with the air release channels for releasing hot air therefrom.

In an embodiment of the invention, the pair of pants comprise a hem enrobing the nozzle and the capillary tubes.

The footwear of the body cooling garment is adapted according to the various embodiments of the present invention as detailed below.

As a further aspect of the invention, there is provided a footwear comprising an air pump adapted to pump air when worn by a human or an animal during a pedestrian movement and to store or direct the pumped air for use by a cooling system for cooling the pumped air and using the cooled air for cooling a body portion of the human or the animal.

In an embodiment of the invention, the air pump comprises a pump inlet valve and a pump outlet valve, wherein the pump inlet valve is configured to be in fluid communication with an external environment for introducing the air inside said air pump from the external environment through a first air communication channel, and the pump outlet valve is configured to be in fluid communication with an air chamber through a second air communication channel for directing the pumped air from the pump to said air chamber, and wherein the pump is adapted to be activated by pressure applied on the footwear by the pedestrian movement, and wherein the air chamber is adapted to be in fluid communication with the cooling system for cooling down the air being pumped.

In an embodiment of the invention, the external environment is the atmosphere.

In an embodiment of the invention, the first and second communication channels are tubes. In an embodiment of the invention, the tubes are made of rubber.

In an embodiment of the invention, the air chamber is an external air chamber located outside the footwear.

In an embodiment of the invention, the footwear has a heel side and wherein the air pump is located at the heel side of the footwear such that the air pump is adapted to be engaged by a pressure applied by a foot heel during the pedestrian movement.

In an embodiment of the invention, the footwear is a shoe, or a shoe insole, or a shoe insert or a combination thereof adapted for use by a human or an animal.

In an embodiment of the invention, the footwear is a shoe insole adapted to be worn by a human, where the insole is preferably made from polymer by casting the polymer material into a mold, and where said air pump is preferably placed inside the casted insole and sewn together with said insole.

In an embodiment of the invention, the air pump is made of a rubber material and has an ellipsoidal shape.

In an embodiment of the invention, the footwear comprises a cover embedding the air pump, the cover having a first opening adapted to be enable the air communication between the external environment and the first air communication channel and a second opening adapted to enable the air communication between the second air communication channel and the air chamber, the air chamber being located outside the footwear.

In an embodiment of the invention, the external air chamber is coated to the cover of the footwear.

In an embodiment of the invention, the cooling system comprises:
  a nozzle adapted to receive and cool down the pumped air;
  a body garment adapted to be worn by the human or the animal comprising air release channels adapted to be in fluid communication with the nozzle for receiving and diffusing the cooled air for cooling the human or the animal.

In an embodiment of the invention, the nozzle has a conical shape adapted to cool the pumped air when the air passes through the nozzle.

In an embodiment of the invention, the nozzle and the body garment are configured according to the various embodiments of the present invention.

As another aspect of the invention, there is provided an air cooling system for cooling a body portion of a human or an animal, the air cooling system comprising:
  an air pump comprising a pump inlet valve and a pump outlet valve, the air pump being adapted to be embedded within a footwear and to pump air when the footwear is worn by a human or an animal during a pedestrian movement; and
  a nozzle having a conical shape, said conical-shaped nozzle having a hollow base, a hollow top, and an external wall, the nozzle comprising a nozzle inlet located at the hollow base of said conical-shaped nozzle and a nozzle outlet located at the hollow top of said nozzle, wherein the nozzle inlet is configured to receive the pumped air inside the nozzle for cooling by the effect of passage of the air inside the conical-shaped nozzle between the nozzle inlet and the nozzle outlet.

The nozzle of the cooling system can be adapted according to the various embodiments of the present invention.

The footwear of the cooling system can be adapted according to the various embodiments of the present invention.

In an embodiment of the invention, the nozzle is adapted to cool down the temperature of the air around 20 degrees Celsius.

In an embodiment of the invention, the air cooling system of the present invention adapted to be portable, particularly suitable to be used by outdoor workers, and configured to cool down the temperature of the worker environment from about 45° C. to about 25° C. using a sustainable source of energy. The air cooling system of the present invention has shown excellent results in terms of efficiency and sustainability. On the other hand, the air cooling system as implemented in a cooling suit also has shown to fulfill successfully its function.

In an embodiment of the invention, the body cooling garment is a cooling suit comprises pants and vest adapted to be worn by a user and having means therein for cooling the body of the user, wherein said cooling suit system comprising the air cooling system of the present invention.

In an embodiment of the invention, the footwear comprises a shoe comprising a sole made of steel material for puncture protection, and preferably comprises additional hollow material located on the outer side of said shoe adjacent to the leather cover forming the air chamber. More preferably, said additional hollow material forming the air chamber is connected to the pants through a connector, wherein said pants contain said nozzle, and wherein said nozzle is preferably located in a hem that is located in the outer side seams of said pants.

In an embodiment of the present invention, the air communication channels are made of rubber material and are extruded from the inlet valve of said air pump to the outer part of said the cover of said shoes. Preferably, the cover is a leather cover.

In an embodiment of the invention, the cooling suit of the present invention further comprises the capillaries located in said hem and are connected to said nozzle through a connector, wherein said capillaries are preferably made of polyvinyl chloride material.

In an embodiment of the present invention, said vest is connected to said pants through a connector located on the bottom side of said vest and wherein said connector is in turn in connection with said capillaries, said vest preferably comprises a plurality of welds that are used for the air heat exchange thus cooling the body of said user.

DETAILED DESCRIPTION OF THE INVENTION

Figure 1:
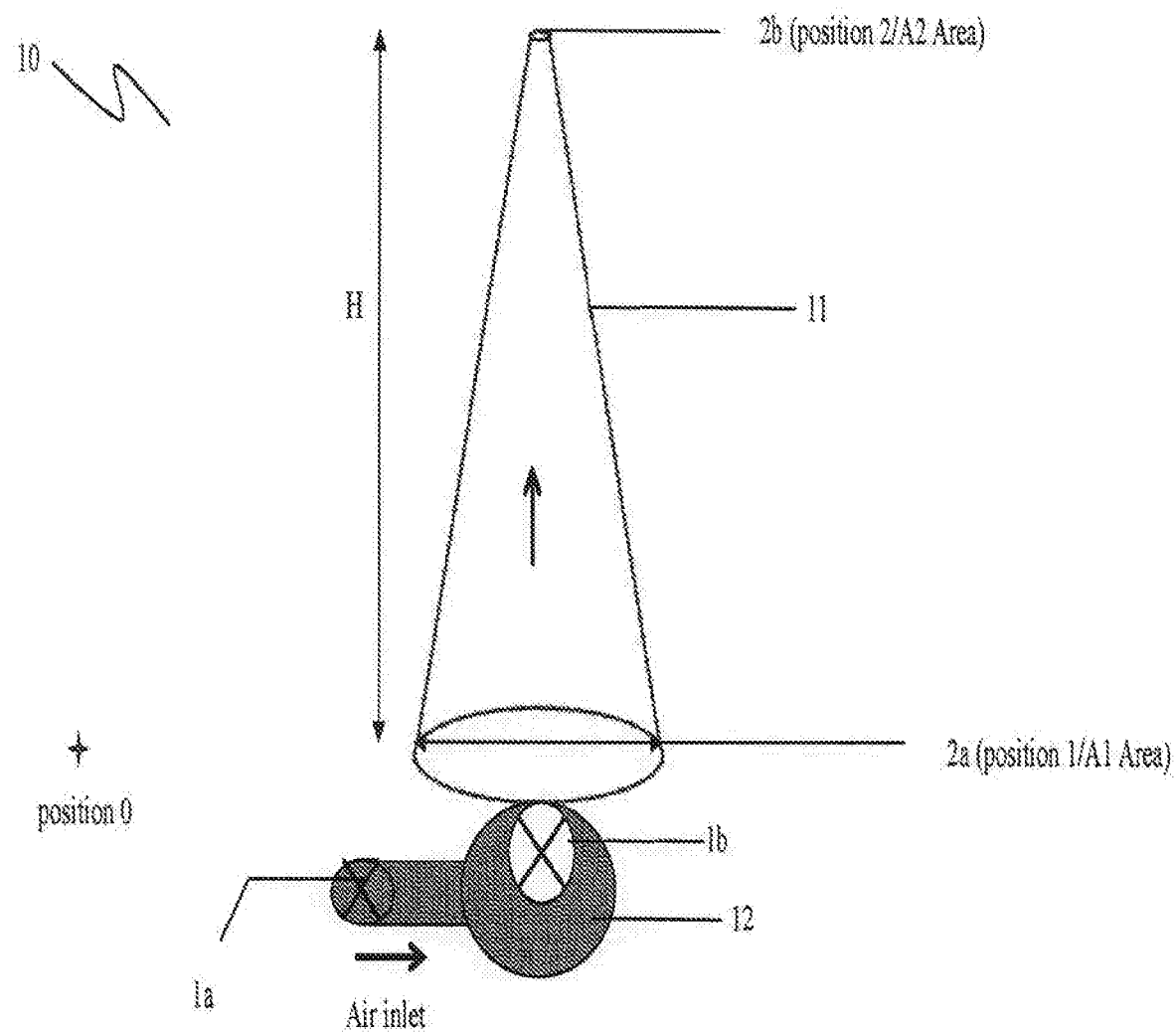
FIG. 1 illustrates air cooling system according to an embodiment of the present invention.

As illustrated in FIG. 1, in a first aspect of the invention, there is provided an air cooling system 10 configured to cool down the room temperature from higher level of temperatures reaching 50° C. to about 25° C. The air cooling system 10 comprises a nozzle 11 having a conical shape and an air pump 12. The nozzle 11 has height H, an inlet 2a and an outlet 2b. The air pump 12 comprises two valves, an inlet valve 1a having an air inlet and an outlet valve 1b having an air outlet. Air enters through valve 1a, exits through valve 1b and then circulates inside the nozzle 11 following the direction from position 1 to position 2. The dimension of the nozzle 11 may vary depending on the application of the air cooling system of the present invention.

For example, for a cooling suit system in accordance with an embodiment of the present invention, the diameter of the inlet area A1 of the nozzle ranges from 2 cm to 5 cm, preferably from 2.5 cm to 4 cm, being most preferably, from 3 to 3.5 cm. To efficiently cool down the temperature of the user from around 50° C. to around 25° C., the height H of the nozzle 11 is calculated to be in the range of 40 cm to 60 cm, preferably 50 cm and by applying mathematical concepts, the diameter of the outlet area A2 ranges between 0.4 cm and 0.6 cm, preferably 0.5 cm. The fabrication material of the nozzle 11 should be somewhat rigid to avoid changes in the volume of air. This is very important for the efficiency of the air cooling system since both the pressure and temperature of the air change, while the volume of the air should remain constant. The material of the nozzle 11 should also be of low friction in order to avoid frictional losses and increase in the pressure consequently. At the same time, the nozzle 11 is preferably made of a temperature isolating material to avoid temperature exchange with the external environment. In an embodiment of the invention, the nozzle is made of a low friction material such as zinc and coated with a temperature isolating material such as isolating foam in order to reduce/restrict the transfer of temperature with the external environment. Examples of suitable materials are PVC and GTFE.

In another aspect of the invention, there is provided a cooling suit comprising the air cooling system 10. The cooling suit is adapted to be used in hot environments such as persons working in hot weather environments, and configured to cool down the temperature of persons from about 45° C. to about 25° C. The suit is configured based on the air pathway needed for the function of said suit.

Figure 2:
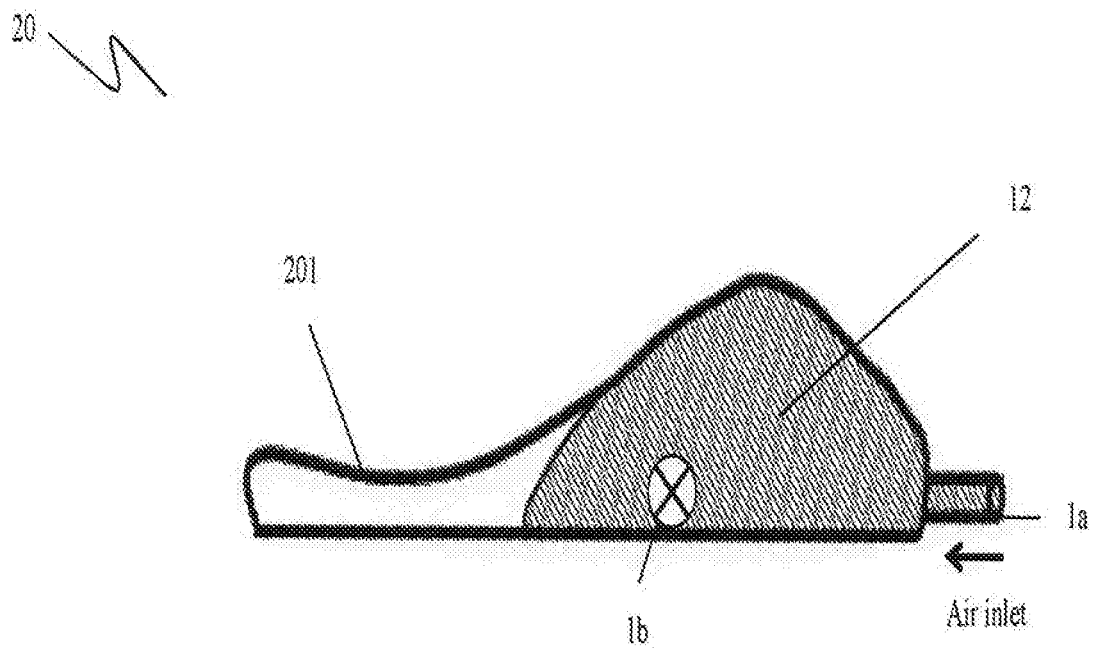
FIG. 2 illustrates a shoe insole comprising an air pump system in accordance with an embodiment of the present invention.
Figure 3:
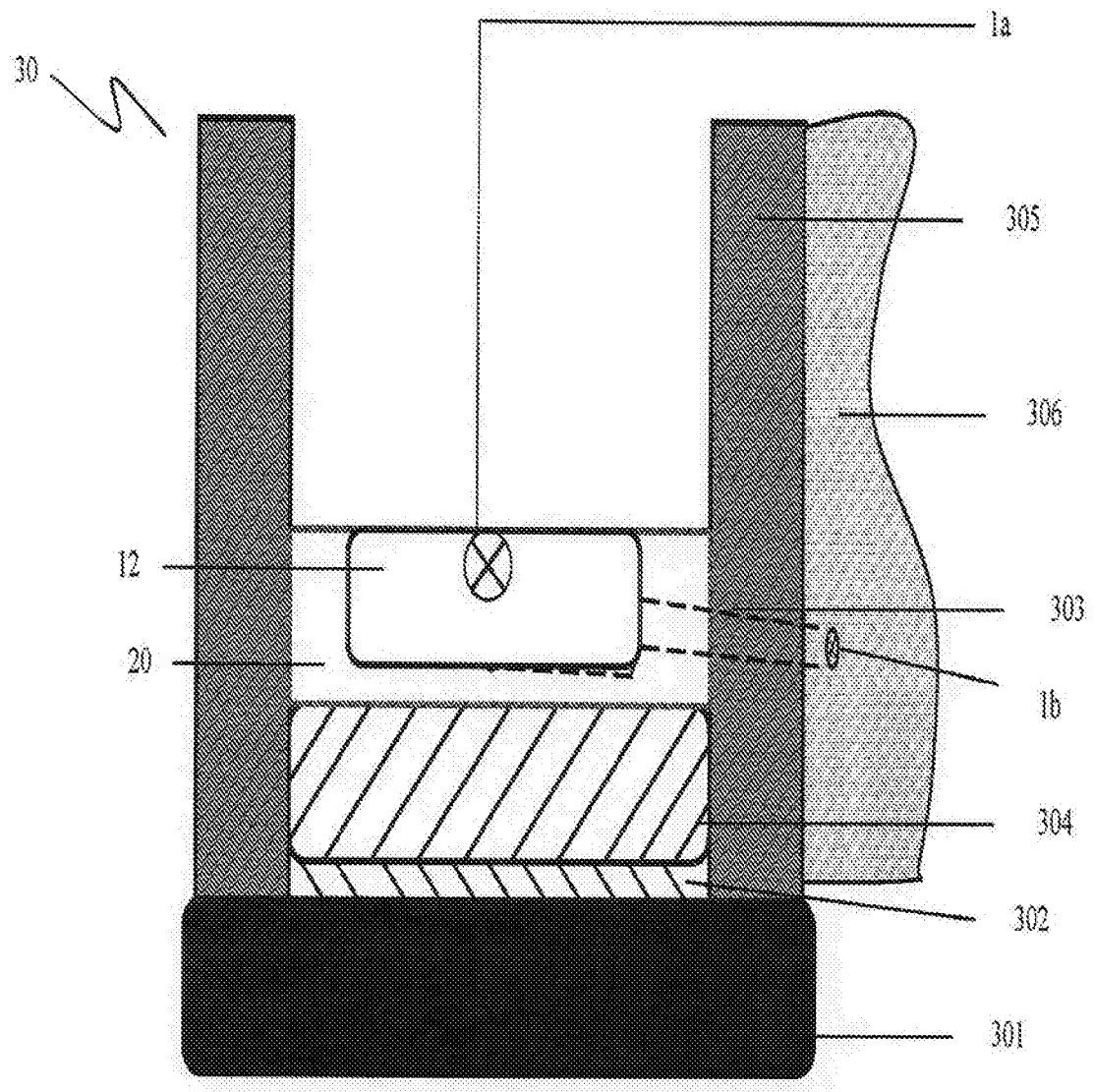
FIG. 3 illustrates a cross-section back view of a shoe comprising an air pump system in accordance with an embodiment of the present invention.
Figure 4:
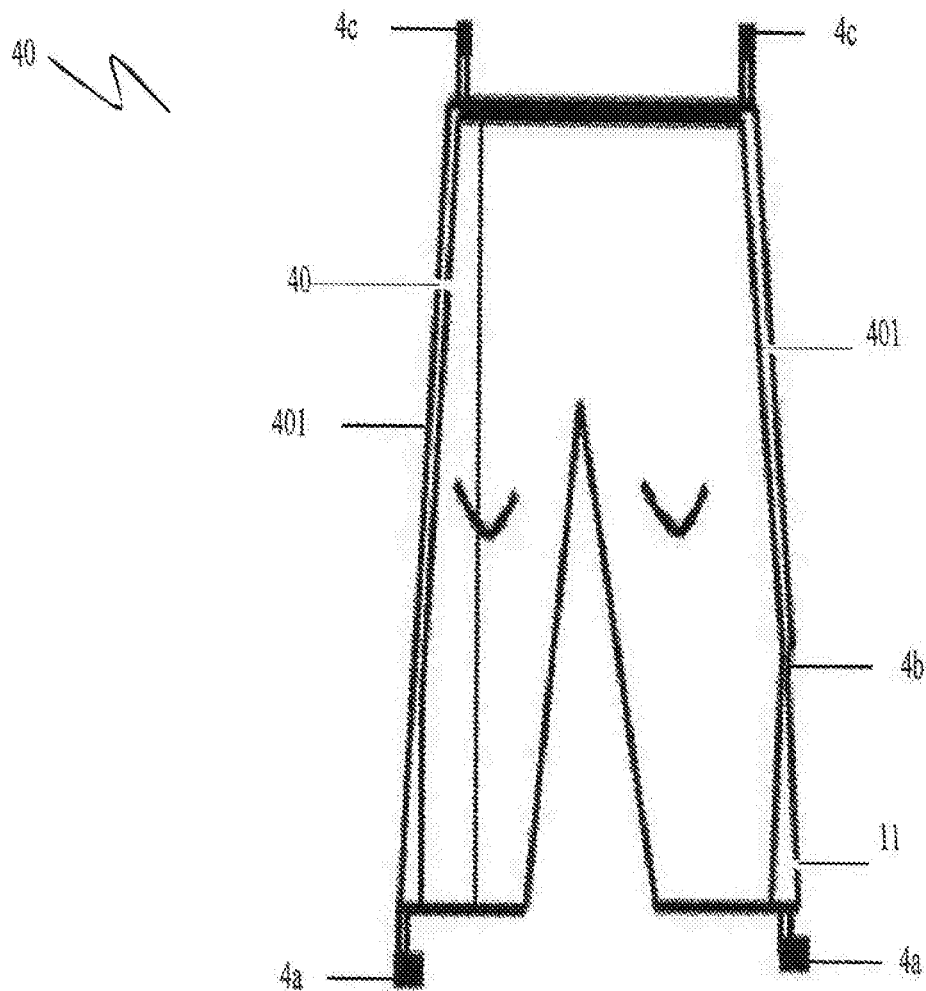
FIG. 4 illustrates a front view of a pants having a capillary system in accordance with an embodiment of the present invention.
Figure 5:
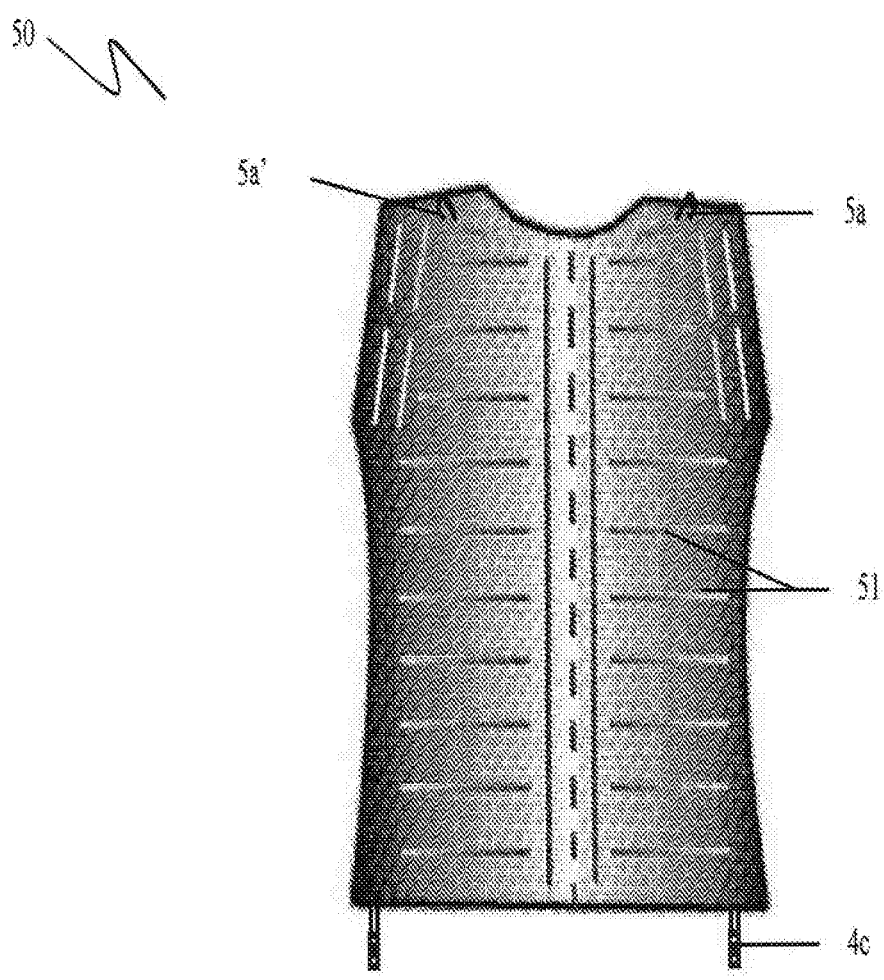
FIG. 5 illustrates a front view of a vest having connexion systems and air exit valves in accordance with an embodiment of the present invention.

In an embodiment of the invention, the cooling suit comprises a shoe 30, a pants 40 and a 50 vest (see FIGS. 3, 4 and 5). The shoe 30 comprises a shoe insole 20 (see FIG. 2) comprising the air pump 12 of the cooling system 10. The air pump 12 is embedded within the shoe insole 20 preferably at the position of the heel where the biggest amount of pressure is applied by a person's feet during a pedestrian movement.

The pump 12 comprises an inlet valve 1a having air inlet adapted to be in fluid communication with the atmosphere, and further comprises an outlet valve 1b having an air outlet adapted to be in fluid communication with the nozzle 11. The shoe insole 20 and the shoe 30 are adapted to have openings to enable the passage of air from the atmosphere to the inlet 1a valve of the pump. During a pedestrian movement, at least a part of the pressure applied by the moving person's feet is transferred to the pump 12 which is adapted to pump air from the atmosphere through the inlet valve 1a in the direction of the outlet valve 1b.

The nozzle 11 is in fluid communication with the outlet valve 1b of the air pump 12 in order to receive the pumped air. The nozzle 11 is preferably located at the pants 40, and the air flows upwardly from the pump 12 located at the shoe insole 20 to the nozzle 11 within the pants 40. In an embodiment of the invention, the nozzle 11 is located in an invisibly zippered hem in the outer side seams of the pants. The nozzle 11 preferably extends between position 1 and position 2 from right above the ankle till right below the knee respectively which is the most stable location that is not affected by human joint movement during walking.

The pants 40 comprise capillary tubes 401 adapted to direct the air leaving the nozzle 11 upwards till the edges of the vest 50 where the air is released freely in between the ultrasonically welded layers 51 of the vest 50. This is where the heat exchange will occur cooling the body. The air then exists the vest 50 through two openings 5a and 5a' located in each side of the top of the vest 50 (see FIGS. 4 and 5).

As illustrated in FIG. 2, the shoe insole 20 comprises an air pump 12, an insole 201. The air pump 12 is preferably an ellipsoid shaped rubber hand pump. The air inlet valve 1a and the air outlet valve 1b of the air pump 12 are unidirectional valves and are adapted to allow the air to flow in one direction only for restricting the air from flowing back in an opposite direction as shown in FIG. 2.

In an aspect, the invention teaches a method of manufacturing the shoe insole 20. The insole 201 is made by casting a polymer material, preferably polyurethane, into a mold. The pump 12 is then placed in the casted insole 201 that is sewn together to secure the pump 12 inside the insole 201. The shoe insole 20 can be replaced from time to time whenever the rubber undergoes fatigue due to extensive usage, or when the insole 201 becomes uncomfortable. For a better performance of the air cooling system 10 used in a cooling suit, it is essential to make sure that the sole fits in the insole 201 without affecting the comfort or taking from the capacity of where the foot is situated.

FIG. 3 illustrates a cross-sectional back view of a shoe 30 comprising a shoe insole 20 in accordance with an embodiment of the invention. This figure illustrates the various components situated inside the safety shoe 30 seen from the backside section of the shoe including the inlet valve 1a through which the air enters and flows in the direction of the outer part of the shoe 30 through the outlet valve 1b.

The shoe 30 comprises a heel 301, a rigid sole 302, a shoe insole 20 comprising an air pump 12, connections preferably in a form of tubes 303, a middle sole 304, a cover 305 and an air transit chamber 306. The rigid sole 302 is preferably made of steel and is positioned on the surface of said heel 301 inside the shoe 30. The rigid sole 302 is made of a rigid material, preferably steel material, in order to create an isolation zone for protecting the air pump 12 (which is preferably made of rubber) such as being punctured by the heel 301 for example. The rigid sole 302 is also adapted to avoid affecting the movement comfort of the worker. The middle sole 304 is essentially a shock absorber layer that can be made out of rubber and preferably manufactured according to safety standards. The middle sole 304 is adapted to be positioned between the rigid sole 302 and the shoe insole 20. The cover 305 is adapted to cover the shoe components (302, 303, 304, 20) positioned above the heel 301 and form the quarter part of the shoe. The air transit chamber 306 abuts the cover 305 and is adapted to be in fluid communication with the outlet valve 1b through the connection 303 for receiving the air being pumped by the air pump 12. The air transit chamber 306 is adapted to be in fluid communication with the inlet 2a of the nozzle 11.

In an embodiment of the invention, the air pump 12 is made of rubber and the rubber material. In an embodiment of the invention, the air pump 12 comprises the connections 303 also made from rubber extending from the inlet valve 1a (which is fastened to the middle sole 304) to outside the shoe 30 through the leather cover 305. These connections 303 are adapted to be connected to both valves 1a and 1b. The inlet valve 1a allows air to flow inside the air pump 12 for pumping, and the outlet valve 1b allows air to flow outside the air pump 12 to the air transit chamber 306, which is preferably an additional coating material forming a hollow chamber. This air transit chamber 306 is preferably positioned on the outer side of the shoe 30 rather than on the inside to avoid affecting the ease of movement of the worker.

The air pump 12 is connected to the air transit chamber 306 coated on the outer side of the shoe using the connections 303 which are fastened securely without any leakages causing any pressure changes. The connections 303 are fastened using any fastening mechanism such as a screw mechanism or welding for example.

As illustrated in FIG. 4, the pants 40 comprise capillary tubes 401, hems 402, the nozzle 11, an inlet connector 4a, an outlet connector 4b and a pants-vest connector 4c. The air transit chamber 306 is in fluid communication with inlet connector 4a of the pants 40 which in turn is in fluid communication with the inlet 2a of the nozzle 11. The inlet connector 4a is adapted to connect between the air transit chamber 306 and the nozzle 11. The inlet connector 4a can be a valve. The nozzle 11 is adapted to decrease of temperature due to the difference in cross sectional area between the inlet 2a and the outlet 2b of the nozzle 11.

The nozzle 11 is preferably located in a hem 402 located in the outer side seams of the pants 40. The hems 402 are preferably sewn into the pants 40 from one side and invisibly zippered from the other side to allow easy change of the components of the air system in case of failure. The capillary tubes (also names the capillaries) 401 are also located in the hems 402. The capillary tubes 401 preferably have about 2 centimeters of free space in the hem 402 to prevent the capillaries 401 from being squished if the user bends his knees. The capillaries 401 would then curve outwards in the hem 402 instead of being bent and squished restricting the air passage. The capillaries 401 are connected to the nozzle 11 through the connector 4b which is adapted to be connected the outlet 2b of the nozzle 11. The capillaries 401 are preferably flexible to a certain extent but not too much to bend and get punctured. Example of a preferred material suitable for this purpose is the polyvinyl chloride material (PVC) used in washing machine ducts as they have some level of flexibility and do not get easily punctured.

The pants 40 are made of two layers (not shown in the figure). The inner layer is preferably made of soft material and has to be comfortable to avoid irritating the user. The outer layer and the hem are preferably made of thick material that works as an insulator to prevent heat from entering inside the pants 40.

On the upper part of the capillaries 401, there is provided a connector 4c in fluid communication with the capillaries 401 and the vest 50 for connecting said capillaries 401 to the vest 50 in order to enable the air flow between the pants 40 and the vest 50 (see FIG. 5).

As illustrated in FIG. 5, the vest 50 is connected to the capillaries 401 (not shown in FIG. 5) through the connector 4c. The vest 50 comprises ultrasonically welded layers 51 for the passage of the air arriving from the capillaries 401 through the connector 4c. The air arrives to the vest 50 through the ultrasonically welded layers 51 and is freely released to diffuse between the welds 51 of the vest 50 and absorb heat from the body creating a cooling effect. This is where the heat exchange occurs thus cooling the body of the user. As the cool air in the system gets warmer, it travels through the vest 50 upwards since warm air is lighter than cold air, and is then released out of the vest 50 through two openings 5a and 5a' located on each side of the top part of the vest 50.

Foe efficient heat exchange, in an embodiment of the invention, the vest 50 is made of three layers, an outer layer which is a thick layer that works as an insulator to prevent heat from coming in. The intermediate layer is the container of the air cooling in case the other two layers are porous. The internal layer is in direct contact with the body of the user should be very thin in order to allow efficient heat transfer between the user's skin and the air.

From a process perspective, the hot air pathway starts in the air pump 12 located shoe insole 20 of the shoes 30 which is directed to the air transmit chamber 306 first, then to the nozzle 11 located at the pants 40, followed by a passage through the capillary tubes 401 of the pants upwards till the edges of the vest 50 where the air is released freely in between the ultrasonically welded layers 51 of the vest 50. This is where the heat exchange will occur cooling the body. The air then exists the vest through two openings 5a and 5a' located in each side of the top of the vest 50 behind the clavicle of the shoulders.

Mathematical Proof of Concept:

To illustrate the proof of concept of the air cooling system according to an embodiment of the present invention, some mathematical calculations based of the effect of thermodynamics and fluid mechanics principles were done. In this regard, the inventors took the United Arab Emirates country UAE as a place of reference. According to the "World Weather Online" website, the maximum average temperature occurring in the UAE is 43° C. The goal of the air cooling system is to cool down the temperature at the skin of the user from an average of 45° C. to about 25° C. According to the mass flow rate, it is possible to reduce the area which causes increase in velocity according to Bernoulli Equation. Said increase in velocity causes decrease in pressure which in turns causes a decrease in temperature, at a constant volume, following the ideal gas principle. These steps will be now explained in the detailed mathematical proof of concept. In this regards, and turning now to FIG. 1, three different positions will be considered in the present mathematical proof of concept. Position 0 which is located away from the valve 1a, position 1 located at the end the pump and at the inlet of the conical nozzle 11, and Position 2 located at the end of the nozzle 11 at the outlet area A2.

The first part is studied between position 1 and position 2 in order to find the velocity of the working fluid, which is air in this case, at the inlet of the nozzle 11. The second part is studied between positions 1 and 2 to find the reduction in area needed between the two positions in order to get a temperature drop of 20° C.

First Step:

Energy balance equation between positions 0 and 1 was applied in order to measure the velocity at the exit of the pump 12 and the inlet of the nozzle 11 assuming there is no change in pressure:

The balance equation accounting for the power of the pump is as follows:

$$\frac{P_0}{\rho_0} + \frac{v_o^2}{2} + gz_o = \frac{P_1}{\rho_1} + \frac{v_1^2}{2} + gz_1 - w_p$$

Where:
P: is the pressure at that point
ρ: is the density at that point
v: is the velocity at that point
g: is the gravitational acceleration
z: is the elevation at that point
$w_P$: is the power of the pump $$\frac{P_0}{\rho_0} + \frac{v_0^2}{2} + qz_o = \frac{P_1}{\rho_1} + \frac{v_1^2}{2} + gz_1 - w_p$$

Because $P_0$ and $P_1$ are at atmospheric pressure which is 0 gage, the formula is now:

$$\frac{v_0^2}{2} + gz_0 = \frac{v_1^2}{2} + gz_1 - w_p$$

Since the first point is at the same level of the ground and away from the shoe, it is assumed that $v_0=0$ and the change in height is also zero. Therefore $$0 = \frac{v_1^2}{2} - w_p$$

And, thus, $$w_p = \frac{v_1^2}{2}$$

$v_1$ from the pump's specific energy can be calculated from the following formula:

Energy=$Fd$

The pump's specific energy is equal to $$w_p = \frac{Fd}{m}$$

Where $$w_p = \frac{mgd}{m}$$

Finally $$w_p = gd$$

wherein:
g is the gravitational acceleration
d is the height of the pump and is equal to the distance that the user's foot will go down vertically in order to press the pump and push the air up.
d in this case will be assumed to be $6\times10^{-2}$ m
Substituting we get $$w_p = 9.81 \frac{m}{s^2} \times 6 \times 10^{-2} m$$

$$w_p = 0.5886 \frac{m^2}{s^2}$$

Therefore, going back to the reduced Bernoulli equation we find that $$v_1 = \sqrt{0.5886 \times 2}$$

$$= 1.084988 \frac{m}{s}$$

Second Step

In this step the objective is to find out the final area of the nozzle needed in order to reduce the pressure and therefore the temperature. For convenience, $A_1$ is defined as the area at the inlet of the nozzle having a radius of 3.1 cm. The Area of the nozzle at the inlet is therefore $A_1=3.0191\times10^{-3}$ m². This area is the maximum area of a nozzle that can be installed on the outer side of the shoe in order not to affect the comfort nor the safety of the worker in accordance with the national safety shoes standards. Since the objective is to down the temperature at the outlet of the conical nozzle, at point 2, a good assumption of the temperature at point 2 would be 25° C. Therefore according to the mass flow rate balance equation:

$$\dot{m}_{in} = \dot{m}_{out}$$

$$\rho_1 A_1 v_1 = \rho_2 A_2 v_2 \quad (1)$$

Where:
$\rho_1$=density of the humid air at the inlet of the nozzle
$A_1$=the cross sectional area of the inlet of the nozzle
$v_1$=is the velocity at the inlet of the nozzle.
The unknowns in the above equation are Av A2, ρ2 and v2. Using the energy balance equation without accounting for the pump, as it does not exist between points 1 and 2 we get the following equation $$\frac{v_1^2}{2} + gz_1 = \frac{P_2}{\rho_2} + \frac{v_2^2}{2} + gz_2 \quad (2)$$

since P1 is assumed to be previously zero,
Where the unknowns are the $P_2$, $\rho_1$, $\rho_2$, and $v_2$
The relative humidity of air is assumed to be 60%. As assumed before, at the exit of the pump and inlet of the nozzle, the pressure is the same as the ambient pressure which is =0 gage.

$$P_{tot} = 101325 \text{ pa} = 0 \text{ gage}$$

The equation above will be reduced further later.
$\rho_1$ can be calculated using the following equation by calculating the humid air density knowing the relative humidity and the temperature:

$$\rho_{1humid\ air} = \frac{P_{a1}}{R_a T_1} + \frac{P_{v1}}{R_v T_1}$$

Wherein:
$P_v = \emptyset \times P_{sat}$, wherein
$\emptyset$ is the relative humidity of air=60%=0.6
$P_{sat@45°C.}=9.595$ Mpa
$P_v=0.6\times9.595$ Mpa=5.75 Mpa
$P_a$=dry air pressure=$P_{tot}-P_v$=101325 pa–5.75 Kpa=95.575$\times10^3$ pa $$R_a = \text{specific gas constant for air} = 287.058 \frac{J}{Kg \cdot K}$$

$$R_v = \text{specific gas constant for water} = 461.495 \frac{J}{Kg \cdot K}$$

$T_1=45°$ C.=318.15K $$\rho_{1humid\ air} = 1.086 \frac{Kg}{m^3}$$

The third equation used is the ideal gas law at a constant volume which yields to the following:

$$\frac{P_2}{P_1} = \frac{\rho_2}{\rho_1} \times \frac{T_2}{T_1} \quad (3)$$

The last equation is the same equation as used before to calculate the density of the air at the first point:

$$\rho_{2humid\ air} = \frac{P_{a2}}{R_a T_2} + \frac{P_{v2}}{R_v T_2} \quad (4)$$

Where
$T_2 = 25°$ C. $= 298.15$K
$P_v = \emptyset \times P_{sat}$
Where $P_{sat@25° C.} = 3.1698 \times 10^3$
Again the humidity is 60%=0.6
$P_{v2} = 0.6 \times 3.1698 \times 10^3 = 1901.88$ pa. However, we do not know $P_{a2}$ either, so we will use the following equation:

$$P_{a2} = \text{is } P_2 - P_{v2}$$

Therefore:

$$\rho_{2humid\ air} = \frac{P_2 - 1901.88}{85586.34} + 0.013822$$

$$\rho_{2humid\ air} = \frac{P_{tot}}{85586.34} - \frac{1901.88}{85586.34} + 0.013822$$

Finally $$\rho_{2humid\ air} = \frac{P_{tot}}{85586.34} - 0.0084$$

Taking into consideration a relation between the two variables which is equation 3:

$$\frac{P_2}{\rho_2} = \frac{P_1}{\rho_1} \times \frac{T_2}{T_1}$$

$$\frac{P_2}{\rho_2} = \frac{87464.79 m^2}{s^2}$$

Substituting equation 3 in 2 we find that:

$$\rho_{2humid\ air} = \frac{87464.79 \rho_2}{85586.34} - 0.0084$$

$$\rho_2 = \frac{0.382698 Kg}{m^3}$$

Which leads to $P_2$ being equal to:

$$P_2 = 33472.64 \text{ pa}$$

By using the Bernoulli equation, the speed of the working fluid at the second point is calculated which will later help to find the cross sectional area of the nozzle exit that is needed to get a temperature equal to 25° C. Therefore by reordering the parameters, equation 2 is as below:

$$\frac{v_1^2}{2} + g(z_1 - z_2) = \frac{P_2}{\rho_2} + \frac{v_2^2}{2}$$

By rearranging and substituting the values, $v_2$ is calculated as below:

$$v_2^2 = \left(0.5886 - 9.81 + \frac{67852.36}{0.382698}\right)$$

$$v_2 = \frac{595.47 m}{s}$$

To find the cross sectional area, the mass flow rate equation is used:

$$\rho_1 A_1 v_1 = \rho_2 A_2 v_2$$

$$A_2 = \frac{A_1 \rho_1 v_1}{v_2 \rho_2}$$

$$A_2 = 4 \times 10^{-5} m^2$$

This area has a radius of $$A = \pi r^2$$

$r = 0.0035875$ m

Discussion for Mathematical Proof

From the calculations above, it is possible to reduce the ambient temperature that the user used to feel from 45° C. to 25° C. by installing a nozzle in a fully insulated suit. If the maximum area of a nozzle that can be installed is $A_1 = 3.0191 \times 10^{-3}$ m$^2$, the temperature at the exit of said nozzle can be reduced by 20° C. if the exit area $A_2 = 4 \times 10^{-5}$ m$^2$.

Practical Proof of Concept

Two experiments were done in order to find and test whether the values obtained mathematically are realistic.

A nozzle was made by wrapping A4 paper side by side and sealing the edges with tape to prevent air from escaping. FIG. 1 illustrates a nozzle having a conical geometry wherein the following dimensions were taken as an illustrative example:
A1=3.1 cm
H=50 cm, and
A2=0.5 cm The experiment requires an individual to blow hard at A1 position and the other individual has to put his/her hand at A2 position. The assumed temperature at A1 is equal to or little lower than the human body temperature, 37° C. The felt temperature at the exit was about 24° C. The experiment was conducted successfully proving that the calculations for proving of the concept are correct.

For sake of assurance, another experiment was conducted by changing the temperature at the inlet A1 from 37° C. to a much higher temperature in the range of 40-50° C. to check the effectiveness of the system. A hair dryer was directed at the inlet working A1 at the highest temperature and speed, yet the temperature at the exit was cooled down and ranged between 20-25° C. The experiment with the above mentioned results was conducted using a nozzle made of cardboard rapped with tape.

The air cooling system of the present invention used in a cooling suit has shown a comfortable, practical, and affordable self-sustainable cooling suit that is based on the user's movement without the need of a non-renewable source of energy. This suit is targeted for municipality and construction workers that have to work for long hours under the sun heat. The concept of cooling is proven through the laws of fluid mechanics and thermodynamics.

While the invention has been made described in details and with reference to specific embodiments thereof, it will be apparent to one skilled in the art that various additions, omissions, and modifications can be made without departing from the spirit and scope thereof.

In particular, although the description has specified certain components and materials that may be used in the present invention, those skilled in the art will appreciate that many modifications and substitutions may be made. Accordingly it intended that all such modifications, alterations, substitutions and additions be considered to fall within the spirit and scope of the invention.

What is claimed is:

1. A footwear comprising:
   an air pump, wherein the air pump has an inlet valve and an outlet valve;
   a shoe insole, wherein:
      the air pump is located inside the shoe insole, and
      the shoe insole has openings;
   a nozzle, wherein the nozzle:
      is connected to the footwear and to a first body garment that consists of two layers,
      is located in hems of a first body garment,
      has an inlet that ranges from 3 to 3.5 centimeters,
      has a height of 50 centimeters,
      has an outlet that ranges from 0.4 to 0.6 centimeters, and
      is connected to capillaries, wherein the capillaries are located in the hems and have 2 centimeters of free space inside the hems; and
   a connector, wherein the connector connects the capillaries to a second body garment, wherein the second body garment includes layers that are ultrasonically welded to the second body garment, wherein the capillaries traverse an entire length of the second body garment to edges of the first body garment.

2. The footwear of claim 1, wherein the air pump is an ellipsoid shaped rubber hand pump and the inlet valve and the outlet valve are both unidirectional valves.

3. The footwear of claim 2, wherein the air pump is sewn together with the shoe insole.

4. The footwear of claim 2, further comprising:
   a heel;
   a cover, wherein the cover is located above the heel and the cover is 25% of the footwear;
   connections, wherein the connections extend from the inlet valve to the outer area of the footwear through the cover;
   a middle sole; and
   an air chamber, wherein:
      the air chamber abuts the cover, and
      the air chamber is positioned on the outer side of the footwear.

5. The footwear of claim 4, wherein the connections are fastened using welding.

6. The footwear of claim 4, wherein the air pump is located at the heel.

7. The footwear of claim 1, wherein the nozzle has a conical shape adapted to cool the pumped air when the air passes through the nozzle.

8. The footwear of claim 1, wherein the second body garment has two openings, and the layers include three different layers.

9. The footwear of claim 1, wherein the nozzle has a cross-sectional area with a radius of 0.0035875 meters.

10. A method comprising: receiving, by footwear, air, wherein the air enters the footwear based on movement of the footwear and an air pump within the footwear pumps air to an air transit chamber located on an exterior surface of the footwear; sending the air, by the footwear, to a nozzle, associated with the footwear, wherein the nozzle: is connected to multiple capillaries within a first body garment with multiple layers, is located in hems of the first body garment, and wherein the nozzle has an inlet that ranges from 3 to 3.5 centimeters, a height of 50 centimeters, and an outlet that ranges from 0.4 to 0.6 centimeters; distributing the air through the multiple capillaries and provides cooling within the body garment, wherein the multiple capillaries are located inside the hems of the first body garment and have 2 centimeters of free space inside the hems; and distributing the air, via a connector, associated with the footwear, to additional capillaries within a second body garment, wherein: the additional capillaries traverse an entire length of the second body garment, and the second body garment has three layers, wherein a first of the three layers is an insulator and a second of the three layers transfers heat from skin to the air.

11. A footwear comprising: an air pump, wherein the air pump has an inlet valve and an outlet valve; a shoe insole, wherein: the air pump is located inside the shoe insole, and the shoe insole has openings; a nozzle, wherein the nozzle: is connected to the footwear and to a first body garment that is comprised of two layers, is located in hems of the first body garment, has an inlet that ranges from 3 to 3.5 centimeters, has a height of 50 centimeters, has an outlet that ranges from 0.4 to 0.6 centimeters, and is connected to capillaries, wherein the capillaries are located in the hems; and a connector, wherein the connector connects the capillaries to a second body garment, wherein the second body garment includes layers, and wherein the capillaries traverse an entire length of the second body garment to edges of the first body garment.

* * * * *